(12) United States Patent
Takahashi

(10) Patent No.: US 6,529,390 B2
(45) Date of Patent: Mar. 4, 2003

(54) SWITCHING POWER SUPPLY CIRCUIT

(75) Inventor: Naoki Takahashi, Inagi (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/953,645

(22) Filed: Sep. 17, 2001

(65) Prior Publication Data

US 2002/0057586 A1 May 16, 2002

(30) Foreign Application Priority Data

Nov. 10, 2000  (JP) ........................................ 2000-344145

(51) Int. Cl.[7] ............................................. H02M 3/335
(52) U.S. Cl. .................................. 363/21.14; 363/21.16
(58) Field of Search ............................... 363/20, 21.01, 363/21.12, 21.14, 21.16, 21.06, 21.08, 125, 127

(56) References Cited

U.S. PATENT DOCUMENTS 5,663,877 A * 9/1997 Dittli et al. .................. 363/127
6,081,432 A * 6/2000 Rine et al. ..................... 363/16
6,141,224 A * 10/2000 Xia et al. ....................... 363/21
6,151,233 A * 11/2000 Kondo ......................... 363/125

* cited by examiner

*Primary Examiner*—Matthew Nguyen
(74) *Attorney, Agent, or Firm*—Katten Muchin Zavis Rosenman

(57) ABSTRACT

The present invention relates to a synchronous rectifying type power supply circuit as a switching power supply having a control circuit including a rectifying FET for synchronous rectifying operation in the secondary side of a transformer. A commutating FET can be structured by providing a switching control circuit that is connected to a tertiary coil provided to the transformer to conduct ON/OFF operation of the rectifying FET and commutating FET.

13 Claims, 12 Drawing Sheets

SWITCHING WAVEFORM OF THE
FORWARD TYPE POWER SUPPLY

CURRENT DIRECTION DURING THE SWITCHING ON CONDITION

CURRENT DIRECTION DURING THE SWITCHING OFF CONDITION

→ OUTPUT CURRENT DIRECTION

---▶ CONTROL FET CURRENT DIRECTION

CURRENT DIRECTION DURING
THE SWITCHING ON CONDITION

CURRENT DIRECTION DURING
THE SWITCHING OFF CONDITION

→ OUTPUT CURRENT DIRECTION

┄▶ CONTROL FET CURRENT DIRECTION

SWITCHING POWER SUPPLY CIRCUIT

BACKGROUND OF THE INVENTION

1. Field of the Invention

The present invention relates to a synchronous rectification type switching power supply circuit. With improvement for lower voltage and higher current of LSI, the power supply circuit requires to be formed on a board with higher efficiency. As a method of improving the switching power supply, the secondary side rectifying circuit is generally formed as the synchronous rectifying circuit, but the synchronous rectification sometimes results in the function of an inverse converter that converts the power to the primary side from the secondary side due to the spread and suction of the power supply because parallel operation or various kinds of power supplies are used. The present invention has overcome the problems of the synchronous rectifying circuit with a circuit structure available in common even for various output power supplies of lower voltage.

2. Description of the Related Art

The power supply circuit of the synchronous rectifying system introduces the following systems.

(First System)

FIG. 18 illustrates a first structural example of the related art circuit. In the forward type switching power supply, the positive side in the secondary side of the transformer T is connected with the gate of control FETQ3 to control the gate of the forward side (rectifying) FETQ1, drain of the commutating FETQ2 and gate of the commutating FETQ2. The drain of FETQ3 is connected with the gate of the commutating FETQ2.

The load side of the secondary side of the transformer T is connected with the source of control FETQ3 and drain of forward side FETQ1 and the sources of FETQ1 and FETQ2 are connected and are then connected to the load terminal of the output. L is a choke coil and C is a smoothing capacitor. D9, D10 connected in the primary side of the transformer T are redundant diodes, allowing impression of a plurality of voltages. Q0 is the primary side switching FET (main switch) connected to the primary side of the transformer T. The sign ● given to the transformer T indicates the direction (polarity) of the winding.

The secondary coil voltage of the transformer T becomes 0V between the period of t3 and t4 indicated in the time chart illustrated in FIG. 19 and a gate voltage of the commutating FETQ2 is lowered to result in a large loss (dotted line portion). Therefore, an internal diode of FETQ3 rejects the discharge and holds the gate voltage of FETQ2 in the period t2 to t4. In the period t1 to t2, the commutating FETQ2 is turned OFF due to the short-circuit operation of FETQ3. In FIG. 19, (a) is the secondary side voltage of the transformer T, (b) is the gate-to-source voltage Vgs of the rectifying FETQ1 and (c) is the gate-to-source voltage of the commutating FETQ2.

In this circuit system, when a voltage is impressed to the output side, a bias is applied to the gate of the forward side FETQ1. Thereby, ON operation of the FETQ1 OFF operation of FETQ1 in the forward side occur alternately and thereby an ordinary self-oscillating circuit that repeats the switching operations operates like an inverse converter to start the power conversion to the primary side from the secondary side. The only way for suspending the self-oscillation is to stop the application of an external voltage.

In this circuit, when an output voltage becomes a low voltage power source, the voltage across the transformer T also becomes lower. Accordingly, there is no voltage to drive the FET, and therefore it is required to supply a voltage from the other winding.

(Second System)

FIG. 20 illustrates a second structural example of the related art circuit. The elements like those of FIG. 18 are designated with the like reference numerals. The structural example of this figure is a forward type switching power supply in which the secondary coil n2 and the tertiary coil n3 are provided in the transformer T. The gates of the synchronous rectifying FETQ1, Q2 and the cathodes of the diodes D1 and D2 are connected across the tertiary coil n3.

On the other hand, the sources of FETQ1, Q2 and anodes of the diodes D1, D2 are connected and also connected to the output terminal on the negative side. The drain of FETQ2 is connected to the positive side of the secondary coil n2 and this terminal is then connected to the output terminal in the positive side passing LC of the smoothing circuit. One side of the secondary coil n2 is connected with the drain of FETQ1.

With the switching operation, the FET gate voltage in the positive side of the tertiary coil n3 charges an internal FET gate capacity to turn ON FETQ1, thereby a forward current flows into the diode D2 connected to the negative side of the coil, forming a current route of the positive side. Moreover, the forward voltage of the diode D2 resets the gate-to-source voltage of FETQ2 and stops operation thereof. With the switching of the primary side, the terminal voltage of the transformer T changes alternately to alternately realize the operations explained above.

In this circuit system, the current transmitting side FETQ2 cannot be controlled within the period t2 to t3 with the voltage waveform of the secondary coil. Therefore, a flat transformer voltage waveform is necessary during the period t2 to t1 and an external circuit is further required resulting in a large loss.

However, this circuit is of the system for resetting the gate-to-source voltage of FET with a diode. However, since the gate voltage cannot be reset perfectly with the operation of diode, there rises a problem that both FETQ1, Q2 for synchronous rectification turn ON simultaneously and repeat unstable operations.

FIG. 21 is a time chart indicating operation waveforms of each portion of the second related art circuit. FIG. 21(A) indicates the ideal operation, while FIG. 21(B), actual operation, respectively. In the respective time charts, (a) indicates the secondary voltage of transformer T; (b), the gate-to-source voltage Vgs of FETQ1; (c), Vgs of FETQ2, respectively. In the case of ideal operation illustrated in FIG. 21 (A) Q1 and Q2 alternately repeat ON/OFF to perform correct synchronous rectification. Meanwhile, in the case of the actual operation illustrated in FIG. 21(B), Vgs of Q1, Q2 is so-called floated and thereby, the gate potential is not fixed and accurate ON/OFF operations of Q1 and Q2 cannot be realized.

(Third System)

FIG. 22 illustrates a third structural example of the related art circuit. In this example, the secondary coil n2 and the tertiary coil n3 of the transformer are connected in series in a flyback type power supply and FETQ1 is driven with the tertiary coil. In the flyback system, Q1 is turned ON with the tertiary coil voltage at the switching OFF time to output the excitation energy, of the secondary coil. In the switching ON time, the gate of FETQ1 is pulled to turn OFF with the electrode inversion of the tertiary coil n3. In this circuit, FETQ1 operates when an external voltage is applied from the output terminal for the self-oscillating operation.

The synchronous rectifying system uses FETs for rectification and since higher efficiency and reduction in size can be improved over the diode rectifying system of the related art, the synchronous rectifying circuit using FET in the power supply is mainly used. When a voltage is applied to the gate, FET allows a current to flow in the rectifying direction but since a current also flows in the inverse direction, the power supply may fail because of the following problems.

FIG. 23 is an explanatory diagram of inverse condition operation with an external voltage and the elements like those in FIG. 18 are designated with the like reference numerals. In this circuit system, an external voltage V1 is applied from the output terminal. In the circuit system of the related art, a gate voltage of FET is connected to the output terminal and when the synchronous rectifying FETQ1, Q2 are driven with the application voltage V1, the synchronous rectifying unit continues the self-oscillation because it is similar to the RCC power supply circuit in the saturated operation of the inductance of the transformer T.

When the self-oscillation starts, the circuit is connected with the FET internal diode D30 even if the switching control circuit and main FET stops operation and thereby it continuously operates as the inverse converter to the primary side from the secondary side. An inverse current is converted in the power to the primary side from the secondary side through excitation of the transformer T. In the structure where a redundant diode D10 is connected in the primary side, a current is rejected by D10. Therefore, the inversely converted energy increases the voltage in the primary side and thereby the circuit elements in the primary side fail.

Conditions thought as the case of such breakdown of elements is the parallel connection of the power supply output. FIG. 24 is an explanatory diagram of the parallel operations of the power supply. Numeral 40 designates a power supply apparatus and in this example, three power supplies from #0 to #2 are connected. When one unit (#2 power supply in the figure) of a plurality of power supplies 40 fails, a fault is detected and the voltage turns from the output terminal of the normal power supply, resulting in the inverse conversion. A defective power supply does not stop the operation and continues the inverse conversion operation. When an output is connected to the large current power supply, an absorption current also becomes large and the circuit elements will fail. Moreover, when a defective power supply operates to increase an output voltage, the output voltage turns into the normal power supply. Absorption is also generated due to the fluctuation of output voltage.

In a certain bus, a protection diode is connected and when there is a voltage difference in the power supply, a forward current flows through the protection diode to the lower voltage from higher voltage. FIG. 25 is an explanatory diagram for a turning current. When LSI is assumed as operating with the voltage A and voltage B, a current flows via the protection diode to the lower voltage A from the higher voltage B.

In the condition where there is a difference in the voltages A and B, the voltage A or B fails in output control. Therefore, a voltage difference is often generated when there is the period where any one of the voltages A and B is not driven while the power supply is operated or stopped and accordingly the synchronous rectifying circuit is often in the environment allowing the inverse flow of current.

As explained above, the synchronous rectifying circuit allows the inverse flow of current but since it is not provided with the circuit to detect and control the inverse flow, the power supply may fail. The problem in the operation of this circuit is that the synchronous rectifying circuit is the oscillation circuit driven with the other circuit for continuing the operation even if the switching control circuit stops and that the rectifying circuit is the circuit that cannot control the inverse flow of current.

When various output power supplies are required because the voltage of LSI becomes low, the synchronous rectifying circuit cannot drive FET with a lower voltage and the power supply circuit for drive is required. Development of different circuit structure for each output voltage provides various problems and therefore it is required to form the synchronous rectifying circuit that can be formed with a common circuit without relation to the output voltage is necessary.

The present invention has been proposed considering the problems explained above and an object of the present invention is to provide a switching power supply circuit of a simplified structure that can solve the problems such as unstable operation and breakdown of the synchronous rectifying circuit and may be used in common with a low voltage power supply.

SUMMARY OF THE INVENTION

FIG. 1 illustrates a preferred circuit diagram of the present invention. The elements like those in FIG. 16 are designated with the like reference numerals. In the figure, Q0 is an FET (primary side switching FET) operating as the primary side ON/OFF switch (main switch); T, a transformer. The transformer T is provided with the primary coil n1, secondary coil n2 and tertiary coil n3. Q1 is a rectifying FET and is connected in series with the secondary coil n2. The gate of Q1 is given the control signal from the tertiary coil. Q3 is a control FET connected to the tertiary coil and its gate is given the positive voltage of the tertiary coil n3.

Q2 is a commutating FET and the drain is connected to the positive side of the secondary coil and the source to the negative side thereof. The drain of the control FETQ3 is connected to the gate of the commutating FETQ2. L is a choke coil, C is a capacitor and these choke coil L and capacitor C form a smoothing circuit. 10 designates a switching control circuit for ensuring the ON/OFF operation of the rectifying FETQ1 and commutating FETQ2 and this switch control circuit is a characteristic part of the present invention.

According to the circuit structured as explained above, it is possible to provide the switching power supply of a simplified circuit structure that can solve the problems of unstable operation of synchronous rectification and breakdown of the apparatus and can also be used in common to the low voltage power supply by ensuring the ON/OFF operations of the rectifying FETQ1 and commutating FETQ2 with the switching control circuit 10.

The invention is further characterized in that the switching control circuit 10 is composed of an FET connected between the gate and source of the rectifying FETQ1, an FET connected between the gate and source of the commutating FET and a drive circuit for driving these FETs.

With the structure explained above, unstable operation of synchronous rectification and circuit breakdown can be solved by ensuring the ON/OFF operation of the rectifying FETQ1 and commutating FETQ2.

The invention is further characterized in that a current detecting unit detects an inverse current in the primary side of the transformer and is provided to turn OFF the primary side switching FET when the current detecting unit has detected an inverse current.

With the structure explained above, when the current detecting unit detects the start of the inverse conversion operation, operation of the primary side main switch (primary side switching FET) is stopped and circuit failure can be prevented.

In this invention, when the switching control circuit is composed of the FET connected between the gate and source of the rectifying FET, FET connected between the gate and source of the commutating FET, the drive circuit for driving these FETs and the diode connected between the source of rectifying FET and source of the control FET, the gate voltage of the commutating FET can be clamped with the diode explained above to realize high speed operation.

Moreover, in this invention, high speed operation can be attained through the control of the discharge of the gate of the rectifying FET and the charge and discharge route of the capacitor by connecting the control FET to the tertiary coil provided in the transformer, connecting the first control FET between the gate and source of the rectifying FET, connecting the second control FET between the source of the rectifying FET and gate of the first control FET and connecting a capacitor between the drain and source of the second control FET.

In the power supply circuit providing the switching circuit consisting of the rectifying FET for synchronous rectifying operation in the secondary side of the transformer in the flyback system switching power supply, a couple of control FETs for controlling the rectifying FET and the drive circuit for driving these control FETs.

Moreover, in the present invention, when a transistor that turns ON when the voltage across the current detecting means exceeds the threshold value is provided and the primary side switching FET is turned OFF when such transistor turns ON, the primary side switching FET is turned OFF to stop the operation thereof. Thereby, circuit failure can be prevented.

Moreover, in the present invention, the circuit operation can be stabilized by controlling, when the current flowing through the primary side of the transformer has exceeded the threshold value, an output to become small by reducing an interval with which the primary side switching FET turns ON, using a current transformer as the current detecting unit, converting an output current in the secondary side of the current transformer to a voltage and reducing the interval with which the primary side switching FET turns ON when both the forward current and backward current flowing in the primary side have reduced the threshold value.

Moreover, in the present invention, the circuit operation can be stabilized by controlling the ON time of the primary side switching FET in the case where an over-current or inverse current is detected, under the conditions that a current transformer is used as the current detecting unit, a resistor for converting the forward current and backward current in the secondary side of the current transformer to voltages is provided and the primary side switching FET is controlled with a difference of the voltages generated across these resistors.

Moreover, in the present invention, a self voltage is increased when the backward current is detected to prevent such backward current by providing a circuit that increases the self voltage to prevent backward current when a current transformer is used as the current detecting unit to detect the backward current due to an external application voltage.

Moreover, in the present invention, the switching FET operation can be stopped with a protection circuit such as an over-current detector because an output voltage can be artificially monitored with an auxiliary coil voltage by adding the auxiliary coil to the transformer.

DESCRIPION OF THE PREFERRED EMBODIMENTS

The preferred embodiments of the present invention will be explained in detail with reference to the accompanying drawings.

Figure 2:
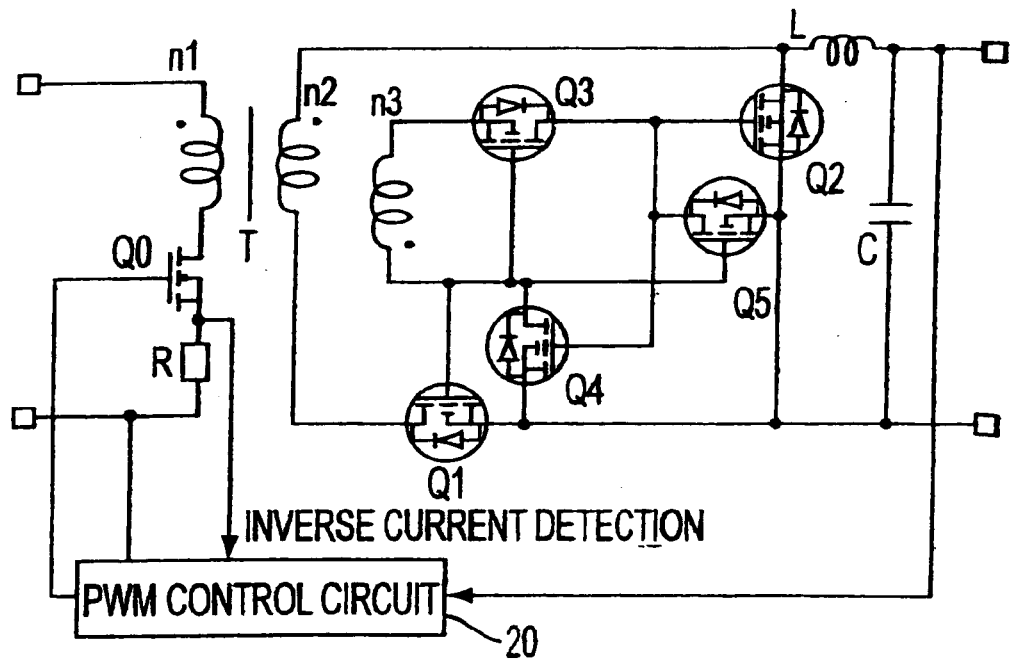
FIG. 2 Diagram illustrating an embodiment of the a circuit of the present invention.

FIG. 2 illustrates an embodiment of the a circuit of the present invention. In this figure, Q0 is a main switch (primary side switching FET), R is a resistor for detecting a current connected in series to FETQ0, 20 is a PWM control circuit for controlling the conductive period of the primary side switching FETQ0 to provide a constant output voltage value by receiving an output voltage.

In the secondary side of the transformer T, n2 is the secondary coil and n3 is the tertiary coil. Q1 is the rectifying FET connected in series to the secondary coil n2, Q4 is a control FET connected between the gate and source of FETQ1, Q3 is a control FET connected to the negative side of the tertiary coil n3, Q2 is a commutating FET connected across the secondary coil n2 of the transformer, Q5 is a control FET connected between the gate and source of FETQ2.

Figure 1:
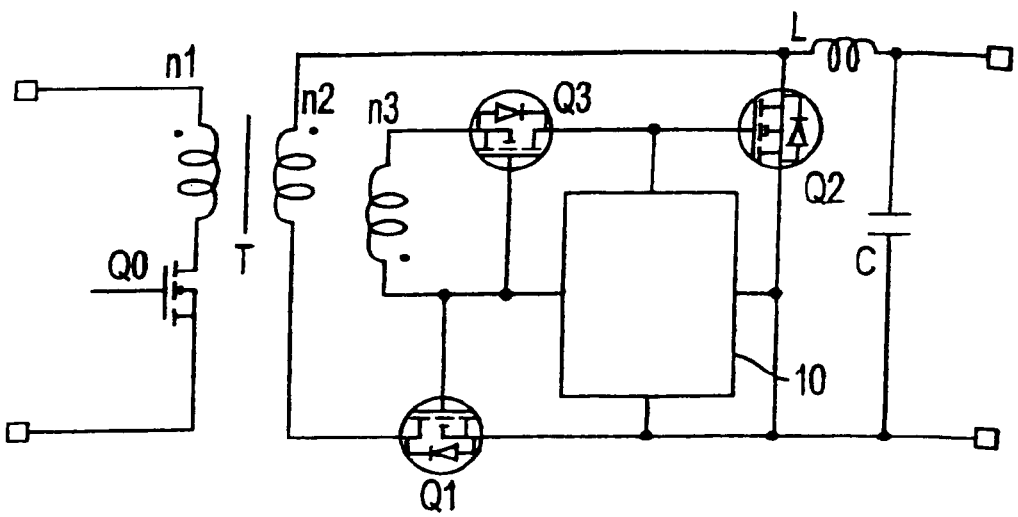
FIG. 1 Illustrative embodiment of a circuit diagram of the present invention.

The positive side of the tertiary coil n3 is connected to the gate of the rectifying FETQ1, while the positive side of the tertiary coil n3 to the gate of the control FETQ3 and the positive side of the tertiary coil n3 to the gate of the control FETQ5. Here, the circuit formed of the control FETQ4, FETQ5 corresponds to the switching control circuit 10 of FIG. 1. An output voltage is fed back to the PWM control circuit 20 and an over-current detecting signal is also inputted thereto and is also given to the gate of the primary switching FET as the control signal in the PWM control circuit 20. Operations of the circuit formed as explained above are explained as follows.

This circuit does not operate as the inverse converter under the conditions explained below. ① There is no route to sending a bias to the gate of the synchronous rectifying FET from an output terminal. ② The synchronous rectifying side does not self-oscillate but is triggered from the other circuit to oscillate synchronously with the primary side switching under the condition that an external voltage is applied. ③ Oscillation is stopped when current absorption (inverse current) is detected.

Next, unstable operation of synchronous rectification can be improved under the following conditions. ④ When operation of the commutating FETQ2 is slow to result in the short-circuit condition at the moment (time t1) where the switching OFF condition turns ON, a voltage generated at the secondary coil of the transformer T is short-circuited and thereby the switching operation becomes unstable. Moreover, efficiency is lowered with a short-circuit current. ⑤ Mutual operations are controlled to prevent that FETs of synchronous rectification (rectifying FETQ1 and commutating FETQ2) simultaneously turn ON. ⑥ A common circuit can be used without relation to a voltage.

The circuit illustrated in FIG. 2 has overcome the disadvantages explained above.

First, since the gate voltage of the rectifying FETQ1 is driven with the tertiary coil n3, no bias is given and the self-oscillation does not occur (②, ②). When the circuit operates as an inverse converter, since the voltage enabling operation of the PWM control circuit 20 is generated even under the non-self oscillation due to the PWM control, the inverse converting operation is continued. Therefore, the current direction is monitored with a current detector resistor R and when a backward current is detected, the PWM control is stopped (③)

In order to ensure the ON/OFF operations of the synchronous rectifying FETQ1, Q2, the FETQ4, Q5 are added to control the gate voltage of FETQ1, Q2. During the period of t1–t2, FETQ3, rectifying FETQ1 and control FETQ5 operate with the voltage from the tertiary coil n3 of the transformer. FETQ5 resets, at high speed, the gate voltage of the commutating FETQ2 with the short-circuit operation with an internal diode and also maintains the reset condition in view of ensuring the charging route of FETQ1.

The rectifying FETQ1 is quickly turned OFF with FETQ4 to form a current route through the short-circuit of the internal diode of Q4. FETQ3 turns OFF, allowing a current to flow toward the internal diode. Thereby, gate voltage of the commutating FETQ2 is generated to urn ON Q2. FETQ5 eliminates delay of the commutating ETQ2 in the moment where the time changes to t and hereby prevents generation of a through-current via the internal diode of FETQ1 (①, ①)

Flow of operations of the circuit illustrated in FIG. 2 is as follows.

When the primary side switching FETQ0 turns ON, a voltage is generated in the tertiary coil n3 of the transformer. As a result, FETQ1, Q3, Q5 turn ON synchronously and thereby the commutating FETQ2 is reset and a gate charging path of the rectifying FETQ1 is formed to turn OFF FETQ4.

When the primary side switching FETQ0 turns OFF, the commutating FETQ2 turns ON via the internal diode of FETQ3 and FETQ4 resets the rectifying FETQ1.

Moreover, this circuit can suppress unstable operation because a through current flowing to FETQ1 from FETQ2 in order to form a charging path for the gate of FETQ2 to turn OFF FETQ5 and turn ON commutating FETQ2 at high speed. With the operations of FETQ4, Q5 connected between the gate and source of the synchronously rectifying FETQ1, Q2, the synchronously rectifying FETQ1, Q2 can be operated alternately.

Figure 3:
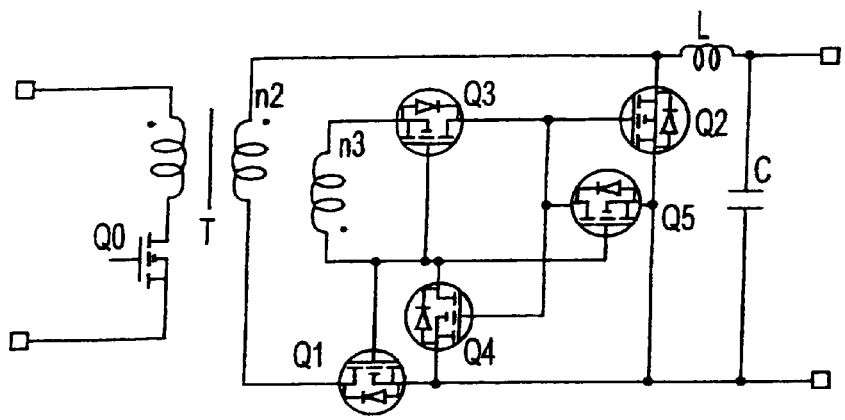
FIG. 3 Circuit diagram illustrating the first embodiment of the present invention.

FIG. 3 is a circuit illustrating the first embodiment of the present invention. The elements like those of FIG. 2 are designated with the like reference numerals.

Figure 13:
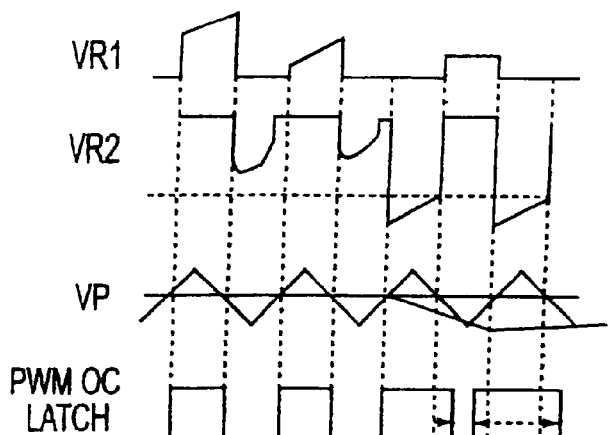
FIG. 13 Diagram illustrating the operation waveforms in the eighth embodiment.

① Period t1–t2:

FIG. 13 illustrates the switching waveform on the secondary side of the transformer. When the primary side switching FETQ6 is switched ON (t1–t2), the tertiary coil voltage gives a bias across the gate and source of FETQ5 but FETQ3 turns ON in the moment (t1) where the tertiary coil voltage changes, the charging current of the gate of FETQ1 flows via the internal diode of FETQ5, therefore it is clamped with the forward voltage of internal diode, the tertiary coil voltage is applied across the gate and source of FETQ5 and FETQ5 turns ON to quickly charge the gate of FETQ1 efficiently. Thereby, the rectifying FETQ1 turns ON.

Since the source and drain of FETQ5 is shorted, the commutating FETQ2 turns OFF to alternately operate FETQ1, Q2. The secondary coil applies a current to an output terminal when FETQ1 turns ON to supply an output voltage passing the smoothing coil L and capacitor C.

When an external voltage is applied to the output terminal during this period, a current passes to the negative side from the positive side of the transformer T via the smoothing coil L and then flows into the rectifying FETQ1. Since the polarity of the secondary coil does not change, the tertiary coil generates a voltage in the same manner as normal operation and thereby FETQ3, Q5 continues the operations explained above.

When a redundant diode is provided in the input terminal side, the primary side conversion is executed with the application voltage without relation to existence of an input voltage and a current is also applied to the PWM control circuit. When the diode is not provided, the primary side power is clamped with an input power not generating an inverse current and when an input becomes OFF, operation is stopped.

② Period t2–t4:

A voltage of the tertiary coil n3 is inverted and a voltage is generated across the gate and drain of FETQ4 but when a current charging the gate of the commutating FETQ2 in the moment of t2, a forward current flows to the internal diode of FETQ4, the voltage across the source and drain is clamped with the forward voltage of the diode, a tertiary coil voltage is impressed across the gate and source of FETQ4 to quickly charge the gate voltage of the commutating FETQ2 efficiently. As a result, the commutating FETQ2 turns ON.

Since the source and drain of FETQ4 are shorted, the rectifying FETQ1 turns OFF to invert the operations of FETQ1, Q2. During the period t2–t3, since the internal diode of FETQ3 rejects the discharge of FETQ2, the gate voltage of FETQ2 is never lowered and the commutating FETQ2 can be turned ON during the period t2–t4.

A current during the period t2–t4 applies an excitation energy of the choke coil L to the positive output terminal and then returns to the coil via the commutating FETQ2. During this period, when an external voltage is applied to the output terminal, a current continuously flows into the commutating FETQ2.

③ Continuation of Switching:

The operations ①, ② are mutually repeated to continue the operation by turning ON and OFF the main FETQ0 with the PWM control. Since the switching period of the synchronous rectifying circuit of the present invention is not given for the self-oscillation of the synchronous rectifying circuit, the whole operation stops when the PWM control circuit 20 stops.

Figure 26A:
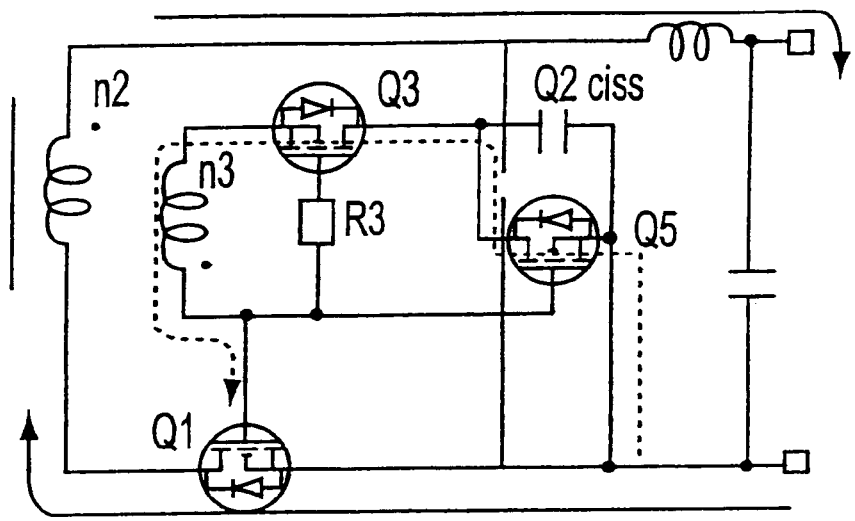
FIGS. 26A and 26B Diagrams illustrating a current direction during the switching ON/OFF operations.
Figure 26B:
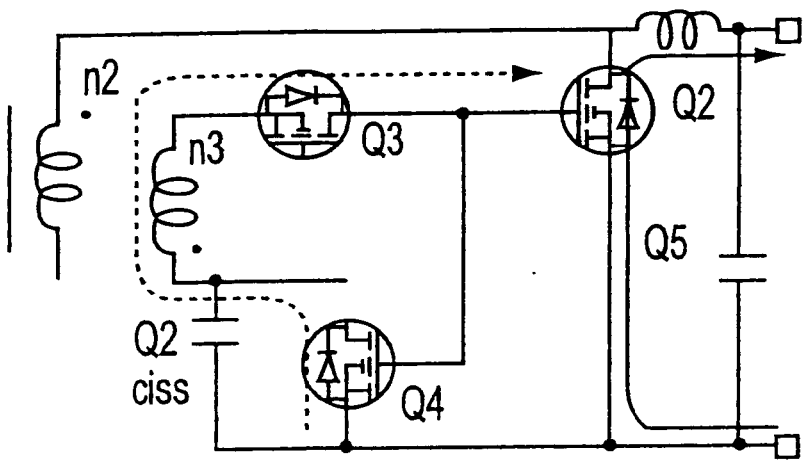

⓪ Operation of control FET:

With the operations of the control FETQ4, Q5 connected between the gate and source of the synchronous rectifying FETQ1, Q2, alternate operations of the synchronous rectifying FETQ1, Q2 may be driven with the high speed and stable operation. FIGS. 26A and 26B illustrate current direction during the switching ON and OFF. FIG. 26A illustrates the current direction during the switching operation, while FIG. 26B illustrates the current direction during the switching OFF period. At the t1 point during the switching ON period of FIG. 15, a current flows in the direction for charging the gate and source of the rectifying FETQ1 with the coil voltage of the tertiary coil n3.

The gate capacitance (Ciss) of the commutating FETQ2 is clamped with the forward voltage of the internal diode of FETQ5 to charge the gate of FETQ1 for rectifying the charging capacitance. Since the gate voltage of FETQ5 rises for operation, the gate of commutating FETQ2 is shorted to complete the operation.

At the t2 point during the switching OFF period, the voltage of the tertiary coil n3 is inverted and a current for charging the gate and source of the commutating FETQ2 flows via the internal diode of FETQ3. The gate capacitance Ciss of the rectifying FETQ1 is clamped with the forward voltage of the internal diode of FETQ4 to charge the gate of the commutating FETQ1 with the charging capacitance. The gate voltage of FETQ4 rises to stop the operation by short-circuiting the gate of the rectifying FETQ1.

Therefore, the FETQ4, Q5 execute the following operations.

(a) A momentary current route is formed with an internal diode.

(b) A gate voltage of the synchronous rectifying FET is clamped.

(c) The synchronous rectifying FET is stopped.

With the operations explained above, high speed synchronous control can be realized.

As explained above, according to this embodiment, the switching control circuit (formed of FETQ3 to Q5 and the drive circuit thereof) 10 can overcome unstable operation of synchronous rectification and circuit failure by ensuring the ON/OFF operations of the rectifying FETQ1 and commutating FETQ2.

Figure 4:
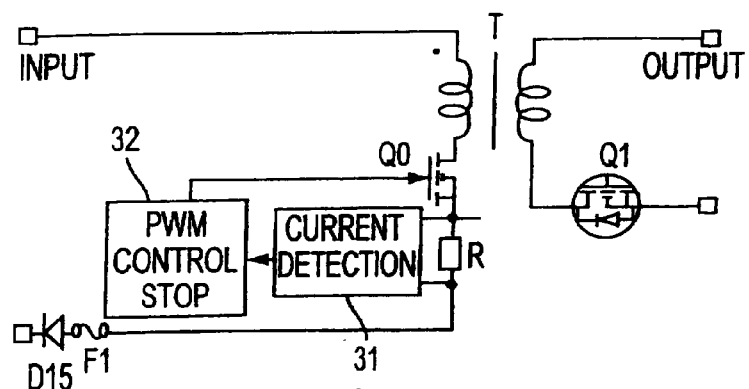
FIG. 4 Circuit diagram illustrating the second embodiment of the present invention.

FIG. 4 is a circuit diagram illustrating the second embodiment of the present invention. The elements like those of FIG. 2 are designated with the like reference numerals. In this figure, Q0 is a primary side switching FET (main switch) for switching the primary coil of the transformer T1, R is a resistor connected in series with the primary side of the transformer T to detect an inverse current during the inverse converting operation, 31, a current detecting circuit for detecting a current flowing into the resistor R, 32 is a PWM control stop circuit for controlling the gate of the primary side switching FETQ0 by receiving an output of the current detecting circuit 31. D15 is a diode, F1 is a fuse connected in series with the primary coil of the transformer T. Operations of the circuit formed as explained above will be explained as follows.

In the switching power supply circuit using the synchronous rectifying circuit that not self-oscillates with an external application voltage, the resistor R works, during the normal operation, as the circuit to detect an over-current flowing in the primary side of the transformer T and when an over-current is generated, the current detecting circuit 31 detects this over-current and the PWM control stop circuit 32 stops the operation of the primary side switching FETQ0.

When a voltage is impressed from the secondary side in this circuit, an inverse current is generated in the primary side of transformer T. This inverse current is detected with the current detecting circuit 31 and is then supplied to the PWM control stop circuit 32. The PWM control stop circuit 32 controls the gate of the primary side switching FETQ0 and stops its switching operation.

According to this embodiment, when the current detecting circuit 31 detects that the inverse converting operation is started, the operation of the primary side main switch (primary side switching FET) Q0 is stopped to prevent breakdown of this circuit.

Figure 5:
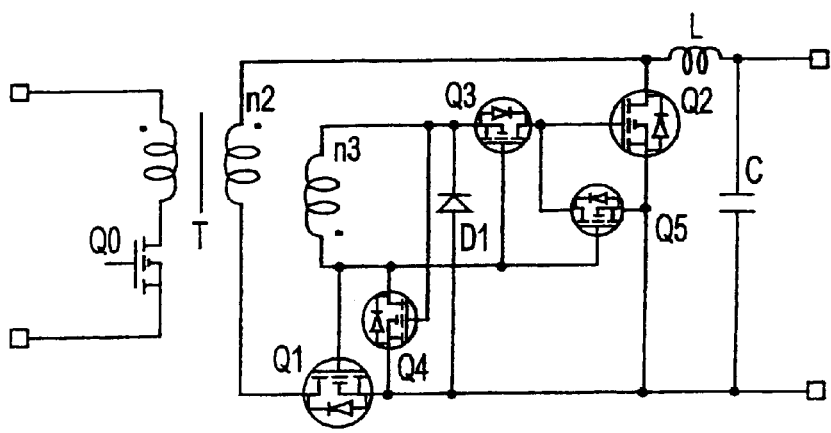
FIG. 5 Circuit diagram illustrating the third embodiment of the present invention.

FIG. 5 is a circuit diagram illustrating the third embodiment of the present invention. The elements like those of FIG. 3 are designated with the like reference numerals. The secondary coil n2 of the transformer is connected to the positive output terminal to the positive terminal, when the primary side switching FETQ0 is turned ON, via the drain of the commutating side FETQ2 and the coil L. The single side of the tertiary coil n3 connects the gate of FETQ4 and the cathode of diode D1.

The gate of FETQ1 is connected to the positive terminal of the tertiary side coil n3, while the gate of FETQ3, drain of FETQ4 and gate of FETQ5 are also connected to the positive side of the tertiary coil n3. The gate of the commutating FETQ2 is connected to the drain of FETQ3 and drain of FETQ5.

The sources of FETQ5, FETQ4, FETQ1 and FETQ2 and the anode of diode D1 are connected to the negative output terminal. Operations of the circuit structured as explained above will be explained as follows.

Figure 27A:
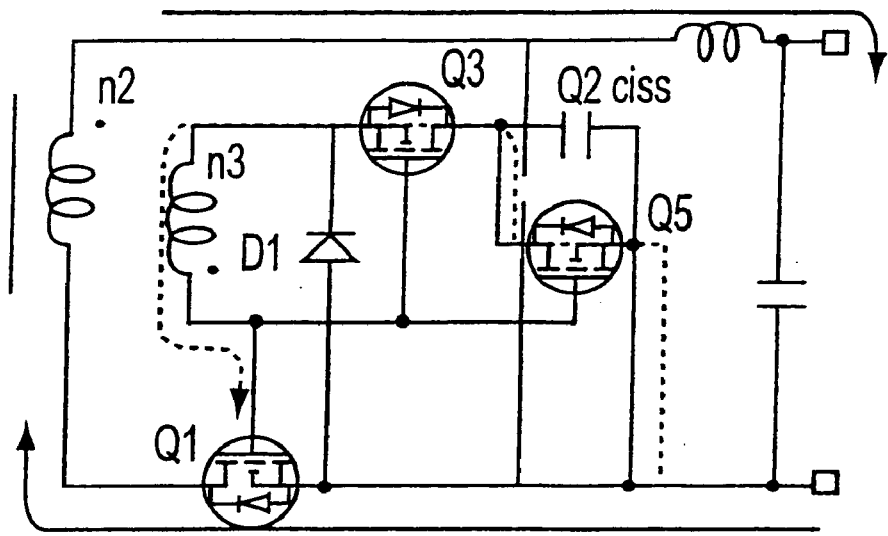
FIGS. 27A and 27B Diagrams illustrating a current direction during the switching ON/OFF operations.
Figure 27B:
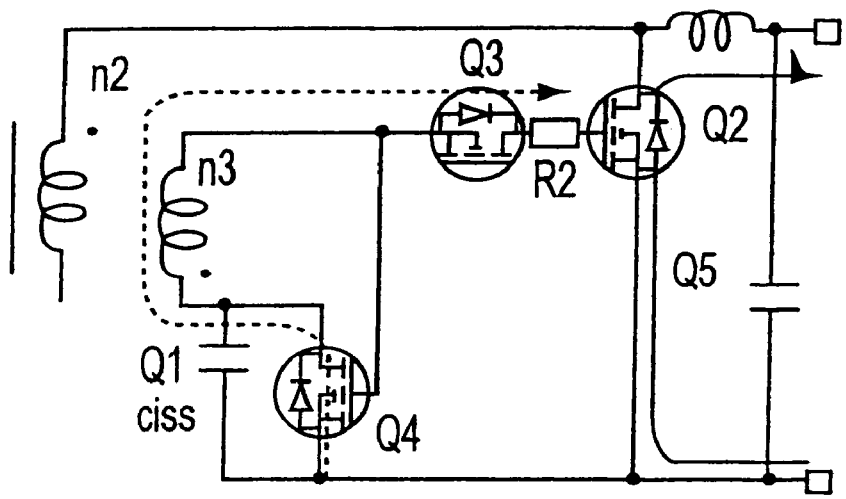

FIGS. 27A and 27B are diagrams illustrating current direction in the switching ON/OFF conditions. FIG. 27A illustrates the current direction in the switching ON condition, while FIG. 27B illustrates the current direction in the switching OFF condition.

Since the FET having higher gate operation voltage of FETQ3 does not operate at the t1 point in the switching ON condition (refer to FIG. 13), charging of FETQ1 is rejected. The charging route in the switching ON condition is formed by connecting the diode D1 to the tertiary coil side.

Figure 15:
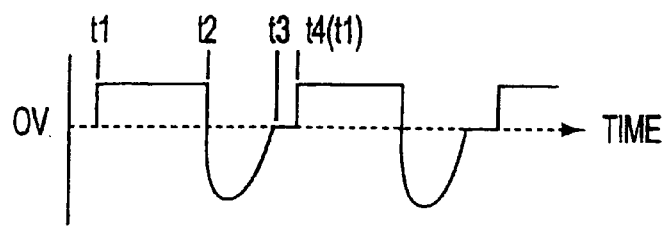
FIG. 15 Diagram illustrating the operation waveforms of the secondary coil of the transformer.

At the t1 point in the switching ON of FIG. 15, the gate of the rectifying FETQ1 is charged through the tertiary coil in which the forward current flows into the diode D1. Thereafter, FETQ3, Q5 operate to form the route to supply the gate capacitance Ciss of the commutating FETQ2 and the commutating FETQ2 stops.

At the t2 point in the switching OFF condition, the tertiary coil voltage is inverted and a current for charging the gate and source of the commutating FETQ2 flows via the internal diode of FETQ3. The gate capacitance of the rectifying FETQ1 is clamped with the forward voltage of the internal diode of FETQ4 to charge the gate of the commutating FETQ2 with the charging capacitance.

During the transformer reset period (t2–t3), when the gate volt-age of FETQ4 rises, the gate of the rectifying FETQ1 is shorted to stop the operation thereof. In the period t3–t4, a voltage is not generated but since the gate voltage of the commutating FETQ2 is rejected with FETQ3, FETQ2 continuously turns ON, allowing an output current to flow. Therefore, it is now possible to control the operation of synchronous rectification at high speed with the diode D1.

Figure 6:
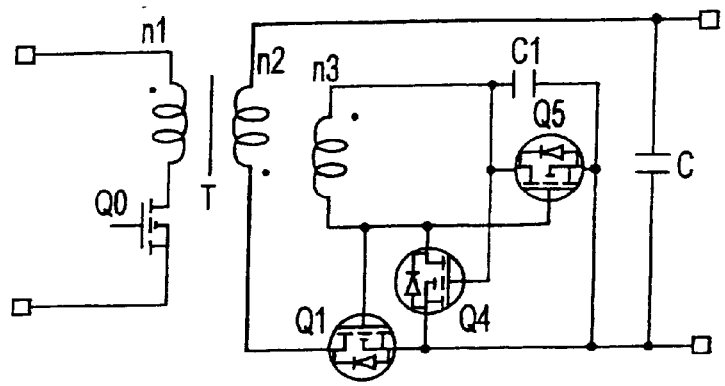
FIG. 6 Circuit diagram illustrating the fourth embodiment of the present invention.

FIG. 6 is a circuit diagram illustrating the fourth embodiment of the present invention. The elements like those of FIG. 3 are designated with the like reference numerals. This circuit indicates the flyback type switching power supply circuit. In this figure, Q1 is a rectifying FET, Q4 is a control FET connected between the gate and source of FETQ1, Q5 is a control FET connected between the gate and source of FETQ4. One end of the tertiary coil n3 of the transformer T is connected to the drain of FETQ5, while the other end to the gate of FETQ1.

C1 is a capacitor connected between the drain and source of FETQ5, C is a smoothing capacitor connected to the output line. This circuit is the flyback type power supply and therefore a choke coil is unnecessary. Operations of the circuit structured as explained above will be explained as follows.

When the primary side switching FETQ0 is in the OFF condition, the drains of the rectifying FETQ1 and control FETQ4 and the gate of the control FETQ5 are connected to the positive side of the tertiary coil n3. As a result, the rectifying FETQ1 turn ON, Q5 also turns ON to discharge the charges accumulated in the capacitor C1. In this case, Q4 is in the OFF condition.

Next, when the primary switching FETQ0 is in the ON condition, FETQ1, Q5 are turned OFF. In this case, the voltage charged in the capacitor C1 maintains the gate potential of FETQ4 to a constant value to turn OFF FETQ4.

In the circuit structured as explained above, FETQ4, Q5 controls the discharge of the gate of FETQ1 and the charging/discharging route of the charges accumulated in the capacitor C1 for each switching operation to assure high speed operation. Moreover, the synchronous rectifying FETQ1 can be operated with FETQ4 and FETQ5 that are connected between the gate and source of the synchronous rectifying FET to alternately operate with each other.

Figure 7:
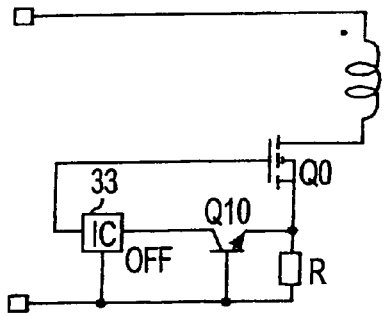
FIG. 7 Circuit diagram illustrating the fifth embodiment of the present invention.

FIG. 7 is a circuit diagram illustrating the fifth embodiment of the present invention. The elements like those of FIG. 4 are designated with the like reference numerals. In this figure, Q0 is a primary side switching FET and Q10 is a transistor of which base and emitter are connected to both ends of the current detection resistor R. 33 is an IC circuit connected to the collector of the same transistor and this IC circuit 33 is given to the gate of the primary side switching FETQ0. Operations of the circuit structured as explained above will be explained as follows.

During the ordinary operation, the voltage generated across the resistor R is used to detect an over-current but the transistor Q10 does not operate. Here, when an inverse current flows with the inverse conversion operation from the synchronous rectifying circuit, the transistor Q10 turns ON. The IC circuit 33 stops operation of the primary side switching FETQ0 when the ON operation of the transistor Q10 is detected.

According to this embodiment, when the voltage across the current detection resistor R becomes higher than the threshold value, the primary side switching FETQ0 is turned OFF to stop the operation in view of preventing circuit failure.

Figure 8:
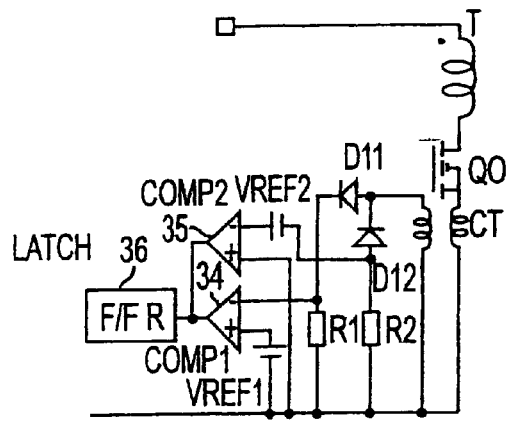
FIG. 8 Circuit diagram illustrating the sixth embodiment of the present invention.

FIG. 8 is a circuit diagram illustrating the sixth embodiment of the present invention. In this figure, Q0 is a primary side switching FET. CT is a current transformer connected in series with the primary side of the transformer T. D11, D12 are rectifying diodes connected to the secondary side of the current transformer. R1, R2 are resistors connected in series to the diodes D11, D12.

Vref1, Vref2 are reference voltages, 34 is a first comparator (comp1) for comparing the voltage generated at the resistor R1 with the reference voltage Vref1, 35 is a second comparator (comp2) for comparing the voltage generated at the resistor R2 with the reference voltage Vref2. 36 is a latch receiving outputs of these comparators 34, 35 as the reset input. The comparators 34, 35 are connected in the wired-OR condition. An output of this latch circuit 36 controls the primary side switching FETQ0. Operations of the circuit structured as explained above will be explained as follows.

Figure 9A:
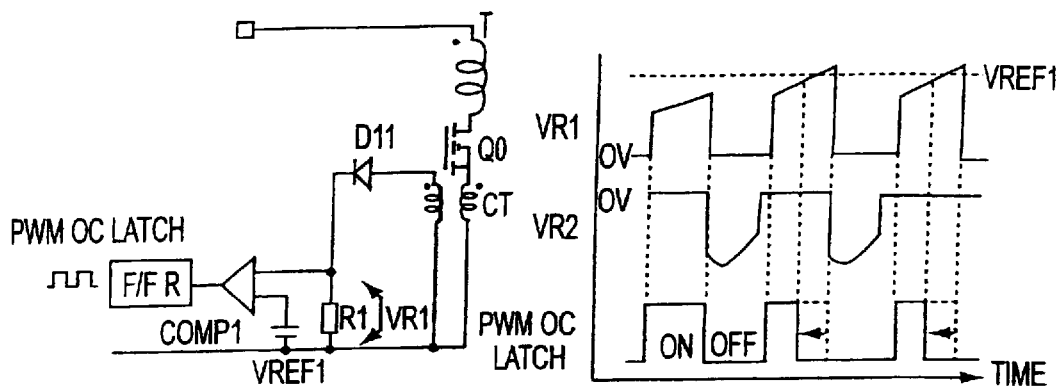
FIGS. 9A and 9B are diagrams illustrating the operation waveforms of the circuit of FIG. 8.
Figure 9B:
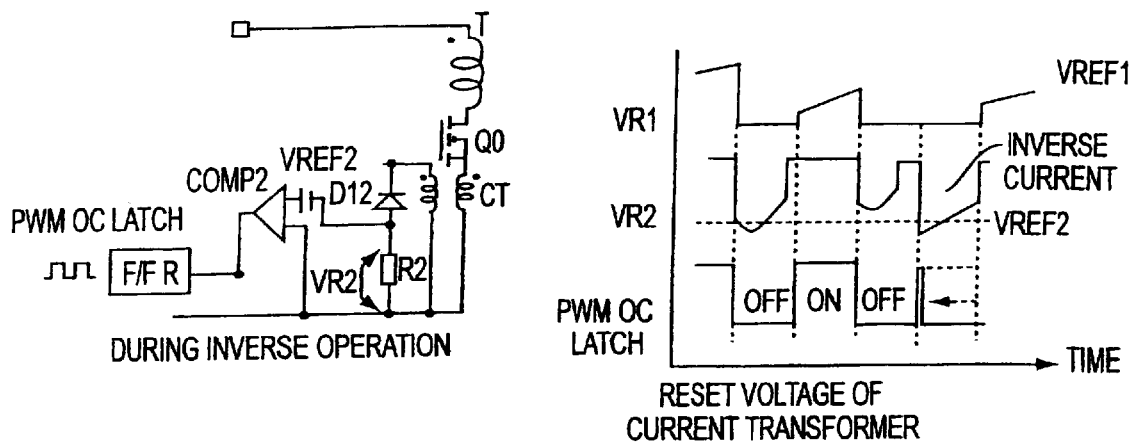

FIGS. 9A and 9B are diagrams illustrating operation waveforms of the circuit of FIG. 8. FIG. 9A corresponds to the ordinary operation, while FIG. 9B corresponds to the inverse operation.

In the ordinary operation condition, if an over-current flows, CMP1 compares the voltage VR1 which is generated at the resistor R1 when the diode D11 turns ON with the reference voltage Vref1. When the voltage VR1 is larger than the reference voltage Vref1, an output of the comparator comp1 makes narrower the switching width of the PWM-OC latch circuit 36 to control the output current.

Moreover, when an inverse current flows into CT, the diode D12 turns ON and comp2 compares the voltage VR2 generated in the resistor R2 with the reference voltage Vref2. When the voltage VR2 generated in the resistor R2 is larger than the reference voltage Vref2, an output of the comparator comp2 stops the switching operation of PWM-OC latch circuit 36.

Detection of the switching OFF period is not executed because PWM is already in the "L" level. As a result, the synchronous rectifying circuit stops operation to prevent the inverse flow of current. VR1 waveform indicates the current waveform flowing in the primary side in the normal operation and the waveform of VR2 is a reset voltage of the current transformer CT generated in the switching OFF condition.

In the inverse current operation, a minus voltage appears as VR2 during the switching ON period and a reset voltage is generated as VR1 during the switching OFF period.

According to this embodiment, the circuit operation can be stabilized with execution of the control to reduce an output by narrowing the ON period of the primary side switching FET when a current flowing in the primary side of the transformer has exceeded the threshold value.

Figure 10:
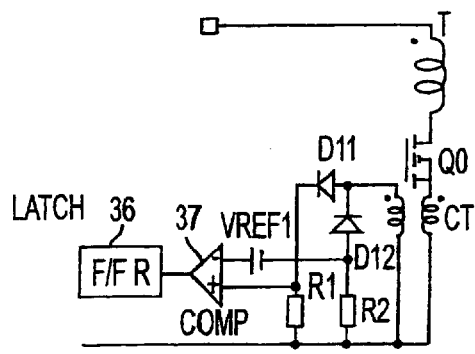
FIG. 10 Circuit diagram illustrating the seventh embodiment of the present invention.

FIG. 10 is a circuit diagram illustrating the seventh embodiment of the present invention. The elements like those of FIG. 8 are designated with the like reference numerals. A voltage generated in the resistor R1 is connected to the positive input terminal of the comparator (comp) 37, while a voltage generated in the resistor R2 is connected to the negative input terminal. However, the voltage generated in the resistor R2 and the reference voltage Vref1 are connected to the negative input terminal. 36 is a latch to receive an output of comp 37 as the reset input to drive the primary side switching FETQ0. Operations of the circuit structured as explained above will be explained as follows.

The alternate waveform of the current transformer CT is rectified to a positive potential and a negative potential with the diodes D11, D12 and the current detection resistors R1, R2 respectively set the detected voltage. When a voltage difference between the voltage of the over-current detection resistor R1 and inverse current detection resistor R2 becomes large and exceeds the reference voltage Vref1, the latch 36 latches an output of comp 37. An output of the latch 36 controls the ON time of the primary side switching FETQ0. As a result, the latch 36 operates to narrow the switching width of the primary side switching FETQ0 in order to control an over-current or an inverse current.

According to this embodiment, the circuit operation can be stabilized with control of the ON time of the primary side switching FETQ0 when an over-current or an inverse current is detected.

Figure 11:
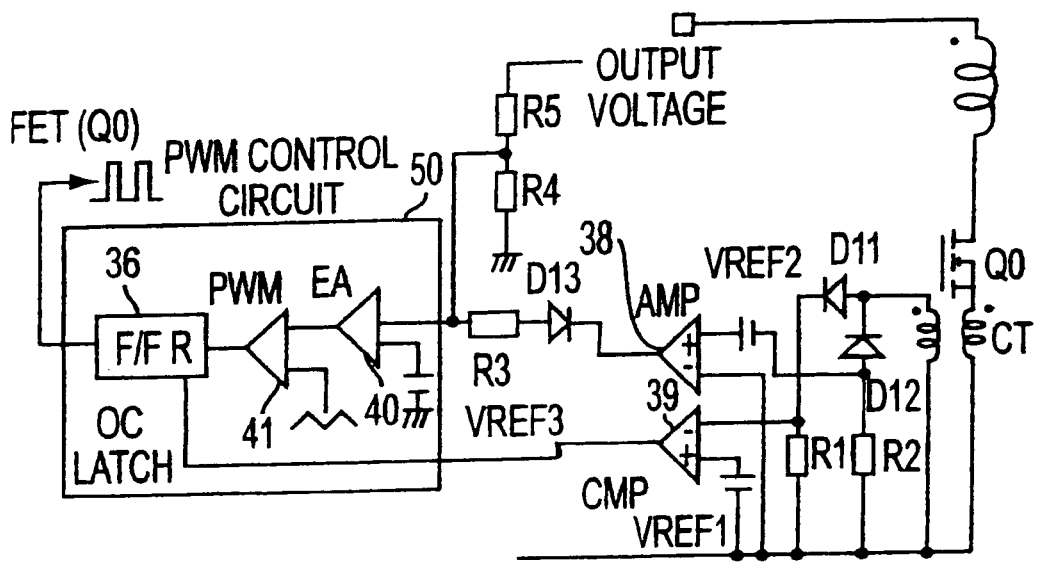
FIG. 11 Circuit diagram illustrating the eighth embodiment of the present invention.

FIG. 11 is a diagram illustrating the eighth embodiment of the present invention. The elements like those of FIG. 8 are designated with the like reference numerals. In the circuit illustrated in the figure, a current transformer CT is used for detection of primary side current, the alternate waveform is rectified respectively to the positive side and negative side with the diodes D11, D12 and the detection resistors R1, R2 for converting each current value to a voltage value are also connected. 38 is an amplifier (amp) for amplifying a difference between the negative voltage VR2 generated in the detection resistor R2 and the reference voltage Vref2, 39 is a comparator (comp) for comparing the positive voltage VR1 generated in the detection resistor R1 with the reference voltage Vref1.

D13 is a diode connected to an output of the amp 38, R3 is a resistor connected to the diode D13 and R4, R5 are voltage dividing resistors for dividing an output voltage. 40 is an amplifier (EA) for amplifying a difference between the difference of the signal inputted from the resistor R3 and a divided signal of the output and the reference voltage Vref3. 41 is a PWM signal generator for inputting an output of amp 40 to one input and a triangular wave to the other input. 36 is a latch for receiving an output of the PWM signal generator 41 to control, with its output, the primary side switching FETQ0. An output of the comparator 39 is connected to the reset input of the latch 36. The PWM control circuit 50 is structured with the amp 40, PWM signal generator 41 and latch 36 for receiving an output of this PWM signal generator 41. Operations of the circuit structured as explained above will be explained as follows.

Figure 12:
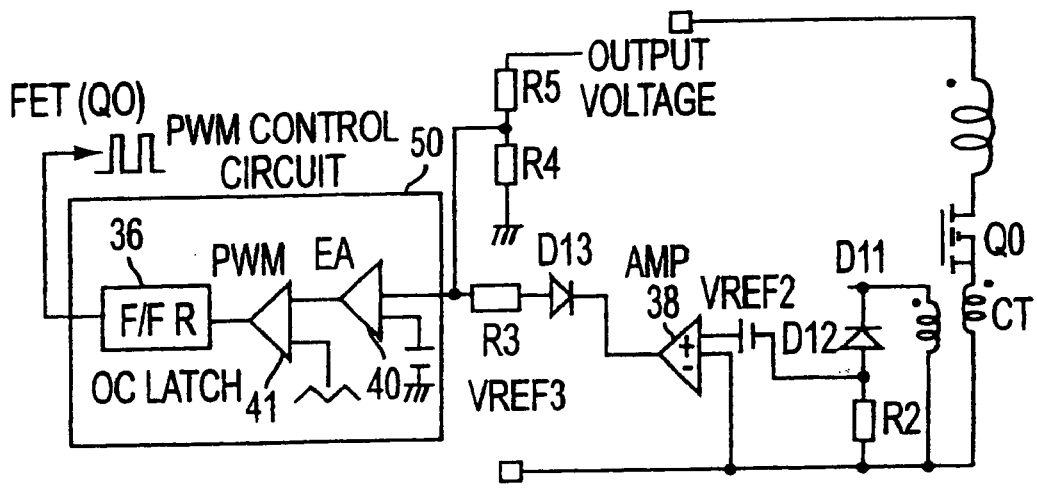
FIG. 12 Diagram for explaining operations of the eighth embodiment.

FIG. 12 is a diagram for explaining the operations of the eighth embodiment of the present invention. FIG. 13 is a diagram illustrating the operation waveform of each circuit of the eighth embodiment of the present invention. In the normal operation, when a primary side current increases, the voltage VR1 applied on the detection resistor RI increases. The comparator 39 compares this voltage and the reference voltage Vref1 and an output of this comparator 39 narrows the switching width of the PWM-OC latch circuit 36 to control an output current.

The AC waveform voltage of the current transformer CT is rectified to the positive and negative potentials with the diodes D11, D12 to respectively set the detection voltages with the detection resistors R1, R2.

Here, when the voltage VR2 of the inverse current direction resistor R2 becomes higher than the reference voltage Vref2 (refer to FIG. 12), an output of the amp 38 becomes "L" level to compensate for the voltage of the feedback voltage VFB from the output voltage to reduce via the diode D13.

As a result, the output VP obtained through error amplification with an error amplifier 40 in the PWM control circuit 50 is compared with the triangular wave with the PWM comparator 41 and thereby the switching width can be widened. Since the duty becomes wider than that of the rated output voltage, a higher output voltage is outputted.

In the inverse current operation, when an output voltage is raised until the inverse current disappears, an output voltage is raised up to the same potential as the voltage applied to the output side and thereby the output voltage is balanced.

According to this embodiment, if an inverse current is detected, the self-voltage is increased and thereby an inverse current can be rejected, enabling the parallel operation.

Figure 14:
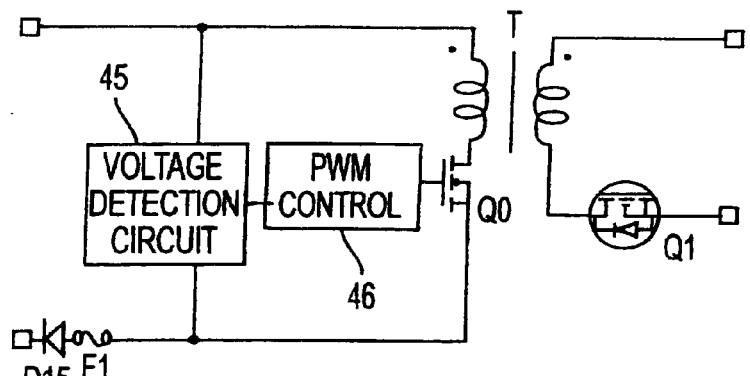
FIG. 14 Circuit diagram illustrating the ninth embodiment of the present invention.

FIG. 14 is a circuit diagram illustrating the ninth embodiment of the present invention. The primary side of the transformer is connected with the series circuit of the diode D15 and fuse F1 to form a loop. 45 is a voltage detection circuit for detecting a fault in the primary side voltage and 46 is a PWM control circuit to control the continuity of the primary side switching FETQ0 by receiving an output of the voltage detection circuit 45.

In the circuit structure as explained above, when a fault on the primary side voltage is detected with the voltage detection circuit 45, the PWM control circuit 46 turns OFF the primary side switching FETQ0.

According to this embodiment, when the primary voltage is detected as the defective voltage (exceeding the rated value), the primary side switching FETQ0 is turned OFF to protect the power supply circuit.

Figure 16:
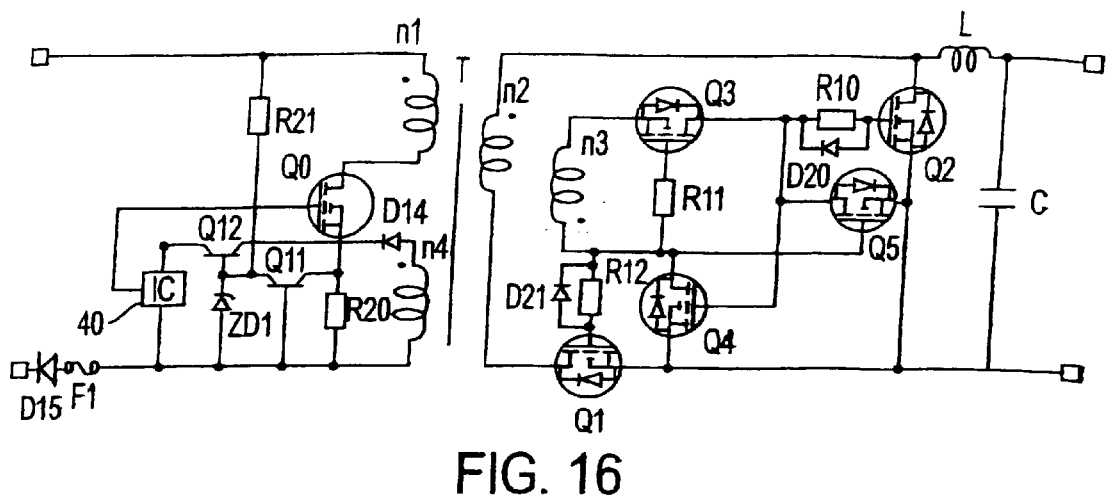
FIG. 16 Circuit diagram illustrating the tenth embodiment of the present invention.

FIG. 16 is a circuit diagram illustrating the tenth embodiment of the present invention. The elements like those of FIG. 3 and FIG. 4 are designated with the like reference numerals. R10 is a resistor connected to the gate of the commutating FETQ2 and D20 is a diode connected a cross the resistor Ron. The other end of the circuit formed of the resistor R10 and diode D20 is connected to the drain of the control FETQ3. R1 is a resistor connected value), the control FETQ3. R12 is a resistor connected to the gate of the rectifying FETQ1 and D21 is a diode connected across the resistor R12. The other end of the circuit formed of the resistor R12 and diode D21 is connected to one end of the tertiary coil n3.

n4 is a quaternary coil (auxiliary coil) of the transformer T. D14 is a diode connected between the quaternary coil n4 and the transistor Q12, R20 is a resistor connected in series with the primary coil n1 of the transformer and Q11 is a transistor in which the emitter is connected to one end of the resistor R20. The base of the transistor Q11 is connected to the common potential. Q12 is a transistor in which the base is connected to the collector of the transistor Q11. R21 a resistor connected to the collector of transistor Q11 and one end of the primary coil of the transformer T. ZD1 is a zener diode connected between the base of transistor Q12 and the common potential. One end thereof is connected to the collector of transistor Q11. The emitter of transistor Q12 is connected to the IC 40 for PWM.

In the circuit structure as explained above, the gate current control resistors R10, R12, the pull-out diodes D20 and D21 are added to the gates of the FETQ1 and Q2 for synchronous rectification in order to realize high speed operation of the FETQ1, Q2 for synchronous rectification. The gate current control resistors R10, R12 control the ringing operation of FETQ1, Q2 to reduce the switching noise of FETQ1, Q2. The gate pull-out diodes D20, D21 turn OFF FETQ1, Q2 at high speed by pulling out the gate currents of the FETQ1, Q2 for synchronous rectification bypassing the gate resistors R10, R12.

An inverse current in the primary side of transformer T is detected by connecting in series the resistor R20 to the primary side coil and then detecting the voltage across the resistor R20 with a voltage Vbe between the base and emitter of the transistor Q11. As a result, the transistor Q11 turns ON and the transistor Q12 turns OFF. Thereby, operation of the dropper power supply (the circuit formed of the transistor Q12 and zener diode ZD1) is stopped from the auxiliary coil n4 of the transformer T and thereby the IC 40 for PWM stops the operation.

Here, the external power supply connected in the secondary side is removed, the normal operation starts to start the PWM operation.

Figure 17:
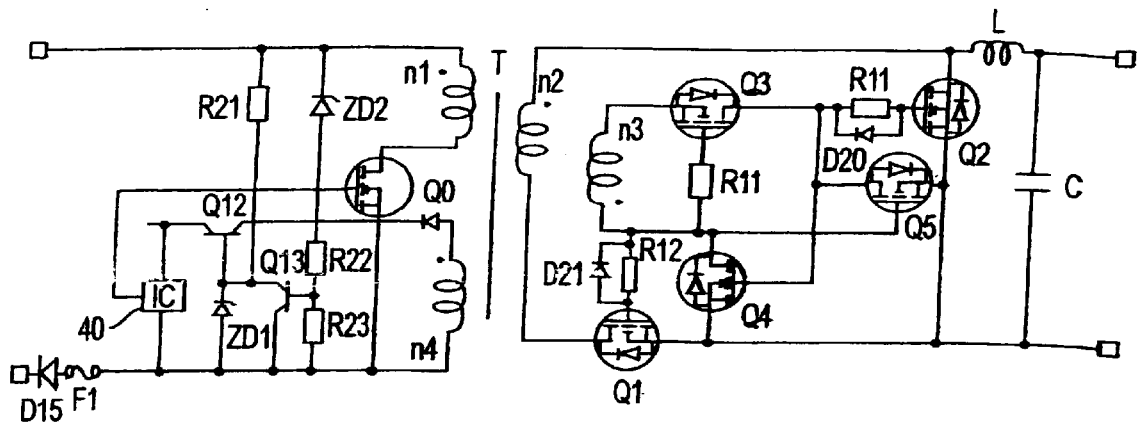
FIG. 17 Circuit diagram illustrating the eleventh embodiment of the present invention.
Figure 18:
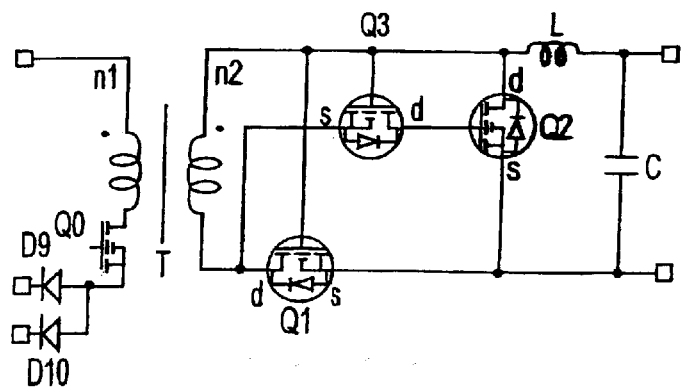
FIG. 18 Diagram illustrating the first structure example of the related art.
Figure 19:
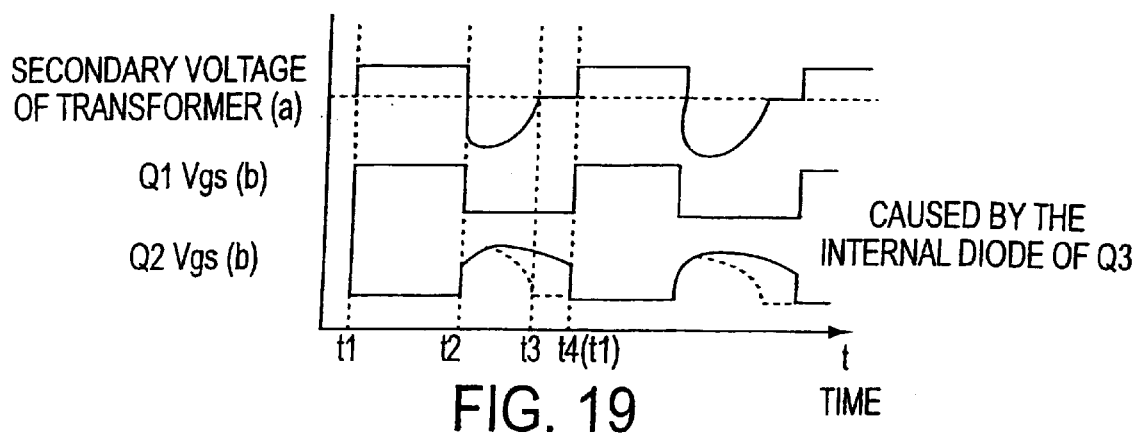
FIG. 19 Time chart illustrating the operation waveforms of respective portions of the first related art (FIG. 18)
Figure 20:
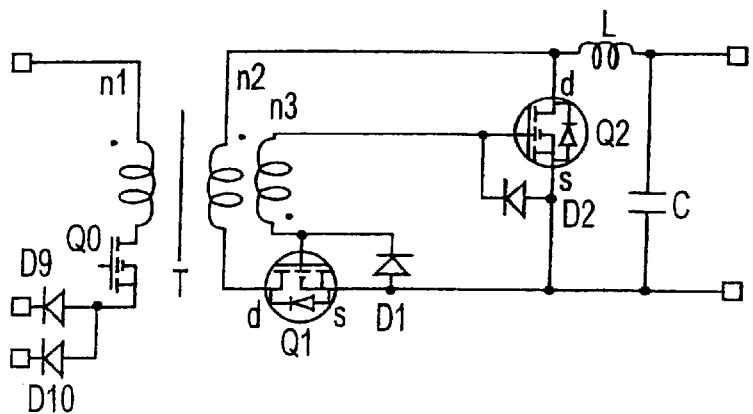
FIG. 20 Diagram illustrating the second structure example of the related art.
Figure 21A:
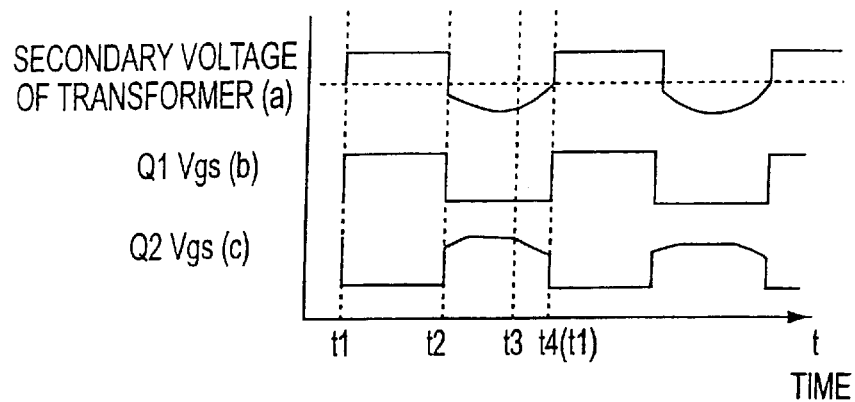
FIGS. 21A and 21B are time charts illustrating the operation waveforms of respective portions of the second related art (FIG. 20)
Figure 21B:
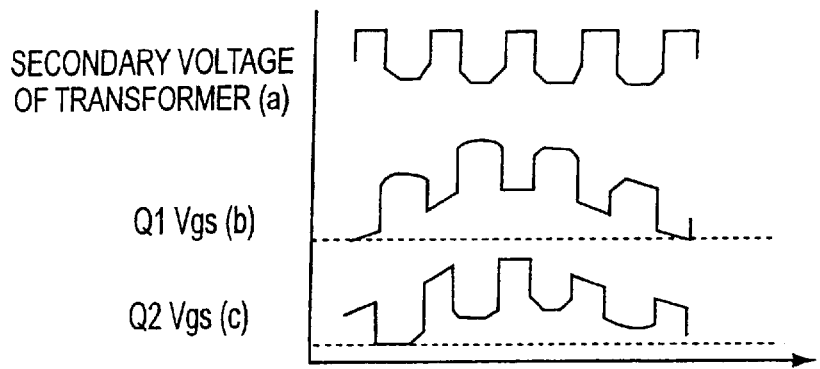
Figure 22:
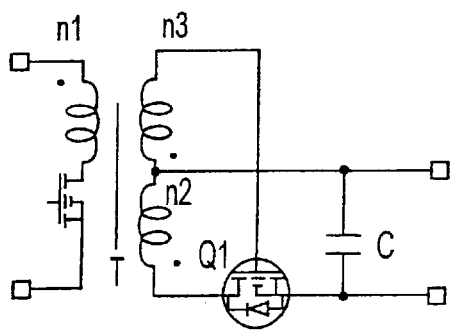
FIG. 22 Diagram illustrating the third structure example of the related art.
Figure 23:
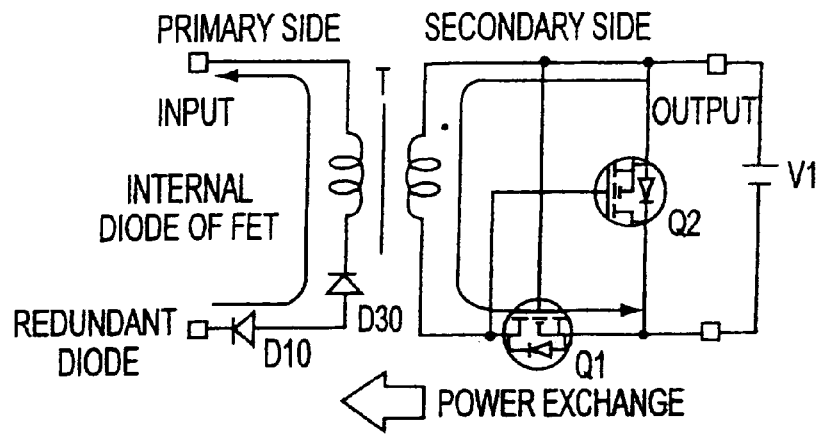
FIG. 23 Explanatory diagram of inverse converting operation with an external voltage.
Figure 24:
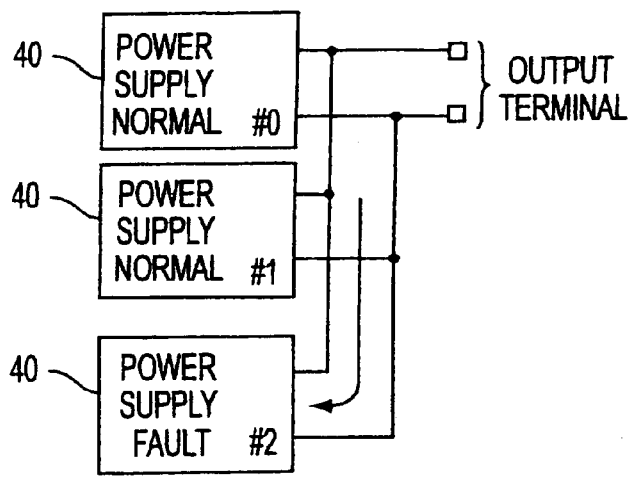
FIG. 24 Diagram for explaining parallel operations of the power supplies.
Figure 25:
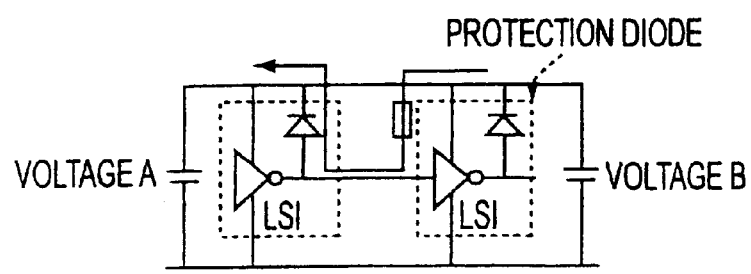
FIG. 25 Explanatory diagram for leak.

FIG. 17 is a circuit diagram illustrating the eleventh embodiment of the present invention. The elements like those of FIG. 16 are designated with like reference numerals. This circuit is identical to the circuit of FIG. 16 in the secondary side circuit of the transformer. At both ends of the primary side coil, a series circuit of the zener diode ZD1, resistors R22 and R23 is formed and the divided voltage of the resistors R22, R23 is given to the base of transistor Q13. The emitter of transistor Q13 is connected to the common potential. The emitter of transistor Q12 is connected to the IC 40 for PWM.

Moreover, the auxiliary coil n4 of transformer T is connected to the collector of transistor Q12. The dropper power supply is formed of the transistor Q12 and zener diode ZD1.

In the inverse converter, since an input voltage rises, the input side voltage detection circuit is formed of a zener diode ZD2 and resistors R22, R23 and when a divided voltage becomes higher than the predetermined value, the transistor Q13 turns ON to pull out the base of the transistor Q12. As a result, the transistor Q12 turns OFF, not supplying a voltage to the IC40 for PWM. Thereby, the operation of IC40 for PWM stops.

As a means for stopping the operation of IC40 for PWM, a method suitable for the IC can be selected because the control method is different depending on the IC such as stop of the softstart circuit of the IC40 for PWM and remote control terminal or the like.

As explained above, according to the present invention, unstable operation of synchronous rectification and the circuit failure can be solved with a simplified circuit structure and such structure can also be used in common for the low voltage power supply. Moreover, the low voltage power supply and large current power supply are essential because of an improvement in the high speed characteristic of LSI and it is difficult to realize synchronous rectification control to control the lower voltage output. However, the synchronous rectifying circuit of the present invention is not influenced by an output voltage. In recent years, a part in which a couple of high speed FETs are formed in one chip is often produced and thereby the mounting space of the synchronous rectifying circuit ca n be reduced. Moreover, since it is possible to develop a power supply with a standard circuit, the development steps can be saved.

The present invention includes a switching power supply circuit in a synchronous rectification type power supply circuit consisting of a rectifying FET for synchronous rectifying operation in the secondary side of a transformer and a control circuit including a commutating FET, characterized in comprising a switching control circuit that is connected with the tertiary coil provided in a transformer to assure the ON/OFF operations of the rectifying FET and commutating FET.

The switching power supply circuit is further characterized in that the switching control circuit is includes an FET connected between the gate and source of the rectifying FET, an FET connected between the gate and source of the commutating FET and a drive circuit for driving these FET elements.

In the switching power supply circuit a current detecting unit detects an inverse flow of current in the primary side of the transformer and turns OFF the switching FET in the primary side when the current detecting unit has detected an inverse flow of current.

The switching control circuit may be formed of an FET connected between the gate and source of the rectifying FET, an FET connected between the gate and source of the commutating FET, a drive circuit for driving these FETs and a diode connected between the source of rectifying FET and the source of control FET.

A switching power supply circuit providing, for the power supply circuit of the flyback system switching power supply, a switching circuit consisting of the rectifying FET for synchronous rectification in the secondary side of the transformer, a couple of control FETs for controlling the rectifying FET and a drive circuit for controlling these control FETs, wherein the control FET is connected with the tertiary coil provided to the transformer, the first control FET is connected between the gate and source of the rectifying FET, the second control FET is connected to the source of the rectifying FET and the gate of the first control FET and a capacitor is connected between the drain and source of the second control FET.

A switching power supply circuit as described above may further be characterized in that a transistor that turns ON when the voltage across the current detecting means has exceeded the threshold value is provided and when this transistor turns ON, the primary side switching FET turns OFF.

A switching power supply circuit as described above may further be characterized in that a current transformer is used as the current detecting unit, an output current of the secondary side of the current transformer is converted to a voltage, when a value of the inverse current for the forward current flowing in the primary side of transformer has exceeded the threshold value, the interval of ON time of the primary side switching FET is narrowed.

A switching power supply circuit as described above may further be characterized in that a current transformer is used as the current detecting unit, resistors for converting the inverse current for the forward current in the secondary side of the current transformer to a voltage are provided and the primary side switching FET is controlled with a difference of voltages generated across these resistors.

A switching power supply circuit as described above may further be characterized in providing a circuit using a current transformer as the current detecting unit to reject an inverse current by increasing a self-voltage when an inverse current due to an external application voltage is detected.

A switching power supply circuit as described above may further be characterized in that an auxiliary coil is added to the transformer, an output voltage is artificially monitored with the auxiliary coil voltage and the switching FET is stopped to operate with a protection circuit for detection of over-voltage.

As explained above, the present invention provides the following effects.

According to the invention there is provided a switching power supply of a simplified circuit structure that can solve problems such as unstable operation of synchronous rectification and circuit failure by executing the ON/OFF operations of the rectifying FET and commutating FET with a switching control circuit.

According to the invention, problems such as unstable operation of synchronous rectification and breakdown of the circuit can be solved by executing the ON/OFF operations of the rectifying FET and commutating FET with the switching control circuit.

According to the invention when the current detecting unit detects start of the inverse conversion operation, the operation of the primary side main switch is stopped to prevent circuit failure.

Moreover a gate voltage of the commutating FET is clamped with a diode to assure high speed operation.

Moreover the discharge of the gate of the rectifying FET and charging/ discharging route to the capacitor are controlled for each switching operation to realize high speed operation.

Moreover, according to the present invention, when the voltage across the current detecting unit has exceeded the threshold value, the primary side switching FET is turned OFF to stop the operation in view of preventing circuit failure.

Circuit operation may also be stabilized through the control of the interval of the ON time of the primary side switching FET to provide a small output when a current flowing in the primary side of the transformer has exceeded the threshold value. In addition circuit operation can be stabilized by controlling the ON time of the primary side switching FET at the time of detecting an over-current or an inverse current.

Moreover, according to the present invention, when an inverse current is detected, the self-voltage is increased to reject the inverse current.

Moreover, according to the present invention, the switching FET can be stopped with a protection circuit through detection of the over-voltage.

What is claimed is:

1. A switching power supply circuit in a synchronous rectification type power supply circuit having of a rectifying FET for synchronous rectifying operation in a secondary side of a transformer and a control circuit including a commutating FET, said switching power supply circuit comprising:
    a switching control circuit that is connected with a tertiary coil provided in said transformer to assure the ON/OFF operations of said rectifying FET and said commutating FET,
    wherein said switching control circuit comprises:
        a first FET connected between a gate and source of said rectifying FET,
        a second FET connected between a gate and source of said commutating FET, and
        a drive circuit for driving said first and second FET elements.

2. A switching power supply circuit in a synchronous rectification type power supply circuit having of a rectifying FET for synchronous rectifying operation in a secondary side of a transformer and a control circuit including a commutating FET, said switching power supply circuit comprising:
    a switching control circuit that is connected with a tertiary coil provided in said transformer to assure the ON/OFF operations of said rectifying FET and said commutating FET; and
    a current detecting means for detecting an inverse flow of current in a primary side of said transformer and to turn OFF a switching FET in a primary side of said transformer when said current detecting means has detected an inverse flow of current.

3. A power supply circuit having a transformer, a switching FET coupled to a primary side of said transformer, and a rectifying FET couple to a secondary side of said transformer, said power supply circuit comprising:
    a tertiary coil one end coupled to a gate of said rectifying FET,
    a control FET having its gate coupled to said one end of said tertiary coil and its source coupled to a second end of said tertiary coil,
    a commutating FET having its drain coupled to one end of said secondary coil and a source coupled to a second end of said secondary coil and a gate coupled to a drain of said control FET, and
    a switching control circuit for ensuring the ON/OFF operation of the rectifying FET and commutating FET.

4. The power supply circuit of claim 3, wherein said switching control circuit comprises:
    a first FET connected between said gate and said source of said rectifying FET,
    a second FET connected between said gate and said source of said commutating FET, and
    a drive circuit for driving the first and second FETs.

5. The power supply circuit of claim 3, further comprising:
    a current detecting unit coupled to said switching FET, wherein said current detecting unit turns OFF said switching FET when the current detecting unit detects an inverse current in said primary side of said transformer.

6. The power supply circuit of claim 5, wherein said current detecting unit comprises a resistor coupled in series with said primary side of said transformer and a control circuit for detecting said inverse current and controlling a gate of said switching FET.

7. The power supply circuit of claim 6, wherein said current detecting unit further comprises a transistor having a base coupled to one end of said resistor and an emitter coupled to a second end of said resistor and said transistor detects said inverse current.

8. The power supply circuit of claim 3, further comprising:
    a diode connected between the source of the rectifying FET and the source of the control FET, wherein the gate voltage of the commutating FET can be clamped by said diode.

9. The power supply circuit of claim 3, further comprising:
    a current detecting unit coupled to said switching FET, said current detecting unit comprising a current transformer connected in series with said primary side of said transformer, wherein said current detecting unit controls an interval with which the primary side switching FET turns ON when a current flowing through said primary side of said transformer exceeds a threshold value.

10. The power supply circuit of claim 9, wherein said current flowing through said primary side of said transformer is determined by converting an output current in a secondary side of said current transformer to a voltage.

11. The power supply circuit of claim 10, wherein a resistor and a diode are provided for each of converting a forward current and a backward current in said secondary side of said current transformer to voltages and said primary side switching FET is controlled with a difference of the voltages generated across said resistors when an overcurrent or inverse current is detected.

12. A flyback power supply circuit having a transformer, a switching FET coupled to a primary side of said transformer, and a rectifying FET couple to a secondary side of said transformer, said flyback power supply circuit comprising:
- a tertiary coil one end coupled to a gate of said rectifying FET,
- a first control FET having its gate coupled to a second end of said tertiary coil and coupled between a gate and source of said rectifying FET,
- a second control FET coupled between said source of said rectifying FET and said gate of the first control FET, and
- a capacitor coupled between a drain and source of said second control FET.

13. The flyback power supply circuit of claim 12, wherein said first control FET and said second control FET control a discharge of said gate of said rectifying FET and a charge/discharge route of said capacitor for each switching operation.

* * * * *